United States Patent [19]

Heitland et al.

[11] 4,190,038
[45] Feb. 26, 1980

[54] SOLAR HEATER

[75] Inventors: Herbert Heitland; Rudolf Kroll; Edgard Grundmann, all of Wolfsburg, Fed. Rep. of Germany

[73] Assignee: Volkswagenwerk Aktiengesellschaft, Wolfsburg, Fed. Rep. of Germany

[21] Appl. No.: 845,652

[22] Filed: Oct. 25, 1977

[30] Foreign Application Priority Data

Oct. 23, 1976 [DE] Fed. Rep. of Germany ....... 2648114

[51] Int. Cl.$^2$ .............................................. F24J 3/02
[52] U.S. Cl. ................................................... 126/445
[58] Field of Search ............................... 126/270, 271

[56] References Cited

U.S. PATENT DOCUMENTS

| | | | |
|---|---|---|---|
| 3,022,781 | 2/1962 | Andrassy | 126/271 |
| 3,453,666 | 7/1969 | Hedges | 126/271 |
| 4,080,955 | 3/1978 | Sandstrom | 126/271 |

*Primary Examiner*—John J. Camby
*Attorney, Agent, or Firm*—Spencer & Kaye

[57] ABSTRACT

A mat-shaped solar heater having multiple parallel flow channels for a heat-carrying medium. Any two adjacent ones of the flow channels have a common linear divider and at least some of the dividers terminate short of an edge of the heater. Inlet and outlet conduits communicate with the interior of the heater for allowing the medium to be introduced into and to flow out of the flow channels. Discharge conduits are provided which communicate with the interior of the heater in the region of the edge in question. When the discharge conduits are closed, the inlet and outlet conduits form the sole communication between the interior and exterior of the heater, whereas when the discharge conduits are open, the medium may flow through these discharge conduits, thereby facilitating the removal of heat-carrying medium from the interior of the heater.

8 Claims, 7 Drawing Figures

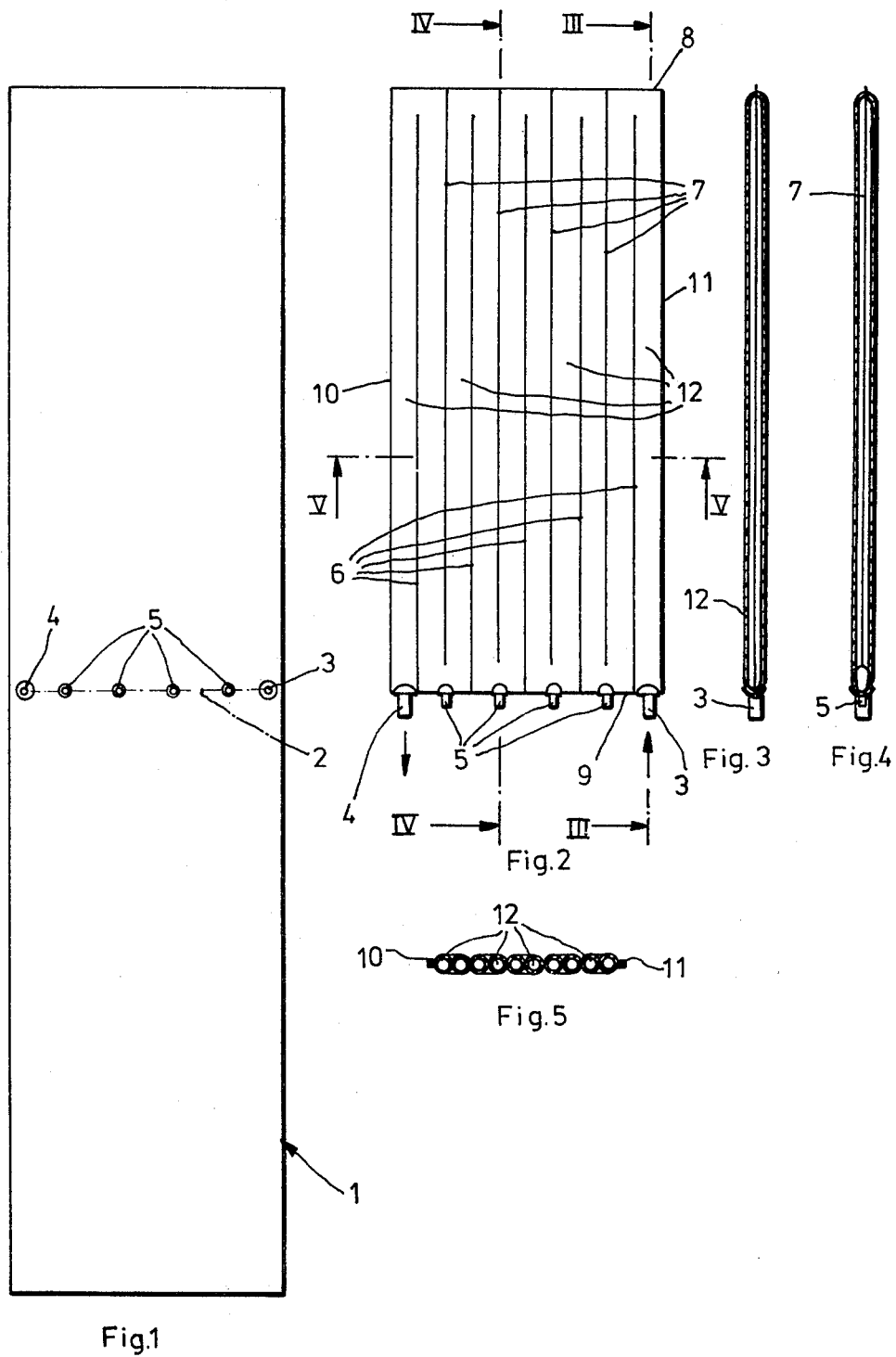

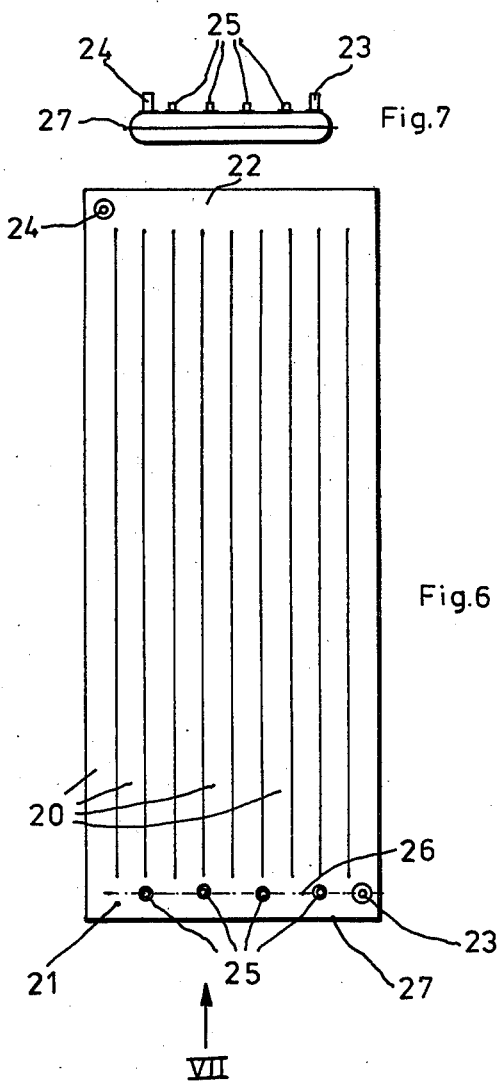

SOLAR HEATER

BACKGROUND OF THE INVENTION

The present invention relates to a solar heater, particularly a solar heater in which there are multiple parallel flow channels for a heat-carrying medium any two adjacent ones of which flow channels have a common linear divider, with at least some of the dividers terminating short of an edge of the solar heater, and in which there are inlet and outlet conduits which communicate with the interior of the heater for allowing heat-carrying medium, as, for example, water, to be introduced into and to flow out of the flow channels. Such a solar heater may be made of two superposed layers of foil material which are fluid-tightly joined to each other along their edges as well as along straight lines, these fluid-tight, straight line joints constituting the dividers so as to form flow channels which are bounded by the two layers and by consecutive dividers. In practice, the two layers may be portions of a single strip of foil material which is folded over so that the two opposite portions of the single strip overlie each other and thus form the two layers, respectively.

A solar heater of the above type is shown, for example, in U.S. Pat. No. 3,022,781, in which the flow channels form a meander-shaped flow path, this being achieved by letting consecutive dividers start out from opposite edges of the mat-shaped solar heater, with each divider terminating short of the other edge, so that there is a comb-like interlacing of the dividers. The inlet and outlet conduits, which may be constituted by plastic tubes, communicate with the two outermost flow channels. In practice, of course, the dividers may terminate short of both edges of the solar heater, so that the flow channels are connected in parallel such that the medium may flow simultaneously from the inlet conduit to a common inlet header and from there through each of the individual flow channels, which thus form parallel flow paths, to a common outlet header and thence to the outlet conduit.

Mat-shaped solar heaters of the above type have the advantage over solar heaters which are made of rigid parts, such as metal plates, that they can be rolled up and thus easily transported. If such a heater is used, for example, for heating a swimming pool, the heater can easily be removed when no heating is required or if the pool is closed. Moreover, the rolled up heater takes up relatively little space so that it can be conveniently stored.

The above advantages notwithstanding, it has been found that mat-like solar heaters of the above-described general type have the drawback that it is difficult to remove all of the water or other heat-carrying medium from the interior of the flow channels. This is so because when there is a less than atmospheric pressure in the flow channels, the foils which form the outside walls of the flow channels will come to lie against each other and even tend to adhere to each other, so that water is trapped within the flow channels, thus making it difficult to empty the flow channels completely.

It is, therefore, the primary object of the present invention to provide a mat-shaped solar heater of the above-described general type which, when it is no longer needed, can easily and quickly be emptied of water or other heat-carrying medium.

BRIEF DESCRIPTION OF THE INVENTION

With the above object in view, the present invention resides in a mat-shaped solar heater of the above general type which is provided not only with an inlet and an outlet conduit but with additional drain or discharge conduits which communicate with the interior of the solar heater in the region of the previously-mentioned edge of the heater, i.e., the edge short of which some of the dividers terminate. These additional discharge conduits are closable such that when they are in fact closed, the inlet and outlet conduits form the sole communication between the interior and exterior of the solar heater and when the discharge conduits are open, the medium may flow through these discharge conduits, thereby facilitating the removal of heat-carrying medium from the interior of the solar heater.

BRIEF DESCRIPTION OF THE DRAWINGS

FIG. 1 is a plan view of a single strip of foil from which a solar heater according to one embodiment of the invention may be made.

FIG. 2 is a plan view of a solar heater from the strip of FIG. 1, the heater being shown in its unfilled state.

FIG. 3 is a sectional side view along line III—III of FIG. 2.

FIG. 4 is a sectional side view taken along the line IV—IV of FIG. 2.

FIG. 5 is a sectional view taken along V—V of FIG. 2, except that the parts are shown in the position they occupy when the heater is filled with a heat-carrying medium, which accounts for the reduced width of the heater as depicted in FIG. 5.

FIG. 6 is a plan view of another embodiment of an as yet unfilled solar heater according to the present invention.

FIG. 7 is an end view of the heater of FIG. 6 taken in the direction of arrow VII; here, too, FIG. 6 shows the parts in the position they occupy when the heater is filled with a heat-carrying medium.

DETAILED DESCRIPTION OF THE PREFERRED EMBODIMENTS

Referring now to the drawings and first to FIGS. 1 to 5 thereof, the same show one embodiment of a mat-shaped solar heater which is made from a single strip of foil material 1, as shown in FIG. 1, this foil material being made of a suitable plastic as, for example, polyvinylchloride. At least half of the strip can be darkened so as to increase its ability to absorb solar radiation. FIG. 1 likewise shows a straight line 2 which is generally in the central region of the strip 1. This line 2 extends transversely to the strip 1 and an inlet conduit 3, and outlet conduit 4, and a plurality of drain or discharge conduits 5 are arranged along this line 2. In the illustrated embodiment, there are four such discharge conduits 5, the same being spaced equal distances from each other. All of the conduits 3,4,5, are fluid-tightly joined to the material of which the strip 1 is made.

The mat-shaped solar heater of FIG. 2 is, in a manner shown in the above-mentioned U.S. Pat. No. 3,022,781, formed by folding the strip 1, with the transverse line 2 being the fold line so that two opposite portions of the strip 1 will come to overlie each other and form two superposed layers of foil material. The fold line 2 now constitutes the lower edge 9 of the heater, as viewed in FIG. 2, the other edges being the upper edge 8 and the two side edges 10 and 11. The edges 8,10,11, are fluid-tightly sealed by welding overlying regions of the foil material, it being unnecessary to weld the lower edge 9. In addition, there are a number of additional linear fluid-tight seals such as welds 6, 7, which extend generally between the edges 8 and 9. As is apparent from FIG. 2, at least some of the dividers terminate short of the lower edge 9 of the mat. Specifically, the welds 6 extend as far as the lower edge 9 but terminate short of the upper edge 8 whereas the welds 7 extend as far as the upper edge 8 but terminate short of the lower edge 9. The two superposed foil portions together with the sealed edges 8, 10, 11, the folded edge 9, and the welds 6,7, thus form multiple parallel flow channels 12 in the interior of the solar heater, namely, two outer flow channels next to the side edges of the heater and a plurality of inner flow channels with any two adjacent inner flow channels sharing a common linear divider 6,7. In the embodiment of FIG. 2, the alternating dividers 6,7, form a meander-like flow path, and as the inlet and outlet conduits communicate with the two outermost flow channels, the arrangement of the flow channels as a whole is such as to provide a meander-shaped flow path extending from the inlet conduit 3 to the outlet conduit 4.

As is likewise apparent from FIG. 2, the inlet and outlet conduits 3, 4, are in alignment with the two outer flow channels and the discharge conduits 5 are in alignment with respective ones of the dividers 7 which terminate short of the edge 9. In this way each discharge conduit 5 is in direct communication with two immediately consecutive inner flow channels 12. It will be noted that any two consecutive flow channels are flow channels which during normal operation of the solar heater, are tranversed by the medium in counter-current flow.

The discharge conduits 5 which communicate with the interior of the solar heater are closable and may be provided with plugs (not shown) or other suitable closure means. During normal operation of the solar heater, the discharge conduits 5 will be closed, so that the inlet and outlet conduits, which allow heat-carrying medium to be introduced into and to flow out of the flow channels, form the sole communication between the interior and exterior of the heater.

If there were no discharge conduits 5, emptying the solar heater, i.e., removing the water or other heat-carrying medium from the meander-shaped flow path, would of necessity be difficult and time consuming, bearing in mind that if the heater is, as described above, made of superposed sheets of foil, there is a marked tendency on the part of the foils to stick together whenever there is less than atmospheric pressure in the interior of the heater. It would be particularly difficult to remove the liquid from the center or inner flow channels, i.e., the flow channels which are not in direct communication with the inlet and outlet conduits 3, 4, which would then be the only conduits through which liquid in the heater could be removed. But by opening the discharge conduits 5, each flow channel can be placed in direct communication with the exterior of the solar heater. In practice, liquid can be removed through every one of the conduits 3, 4, 5, so that since each flow channel 12 is in direct communication with one of the conduits—i.e., liquid to be drained from any one flow channel can reach one of the conduits without first having to flow through another flow channel—substantially all of the liquid can easily and quickly be drained from all of the flow channels. It is not necessary that the liquid in one of the central channels be made to flow along the meander-shaped path and forced out through one of the two conduits 3 and 4.

The presence of the discharge conduits 5 can also be used to advantage during the filling of the solar heater, in that they can be used for the purpose of removing air from the interior of the heater. This avoids the formation of air bubbles in the heat-carrying medium which, as is well known, materially reduce the efficiency of a heater of this type.

The above applies, in principle, to the solar heater shown in FIGS. 6 and 7, which differs from the embodiment of FIGS. 1 to 5 in that the flow channels, designated here at 20, are not connected in series to form the meander-shaped path depicted in FIG., 2 but are connected in parallel so that as the medium flows from the inlet conduit 23 to the outlet conduit 24, it will flow similtaneously through a plurality of parallel flow paths. This result is achieved by letting each linear divider terminate short of both the upper and the lower edges of the heater, so as to form two transverse header channels 21, 22. It will be appreciated that if the conduits 23, 24 were the only conduits communicating with the interior of the solar heater, emptying the same would, as described before, be tedious and time consuming. Therefore, the heater shown in the embodiment of FIGS. 6 and 7 includes the additional discharge conduits 25 which, as described in connection with the discharge conduits 5, are closable so that they can be opened and closed, as desired. It will be noted that every flow channel 20 is in direct communication with at least one of the conduits 23, 24, 25, thus facilitating draining the heater.

In this embodiment, too, all of the conduits 23, 24, 25, are arranged along a straight line 26 which is transverse to the direction of the flow channels. While this line 26 does not coincide exactly with the bottom edge 27 of the heater but is slightly higher, it does lie in the region of the lower transverse header channel 21 and thus in the region of the lower edge 27. The reason for the different location of the line 27 is that, in this embodiment, it is assumed that the two layers of foil are not part of a single, uncut sheet, but rather, that they are constituted by two separate sheets which are welded together along all four of their edges. That is to say, the fourth edge has to be sealed inasmuch as there is nothing comparable to the fold 9 in the embodiment of FIGS. 1 to 5. Therefore, the conduits 23, 24, 25 are positioned so as not to interfere with a welding step that has to be carried out near the bottom edge of the solar heater. This is of practical significance insofar as mass-production techniques are concerned, because the heater shown in FIGS. 6 and 7 can be made by drawing separate strips from two rolls, so as to provide one strip with the conduits 23, 24, 25, whereupon the two foil sections are joined in any suitable manner, such as by welding. It is during this joining step that the edge seals and flow channel dividers come into being.

It will thus be seen that, in accordance with the present invention, there is provided a solar heater which is equipped not only with the usual inlet and outlet conduits for the heat-carrying medium, but with additional conduits which communicate with the individual flow channels in the interior of the heater. It is thanks to these additional conduits that the heater according to the present invention can be drained more quickly and more easily than solar heaters of similar construction but lacking such additional conduits.

It will be understood that the above description of the present invention is susceptible to various modifications, changes and adaptations, and the same are intended to be comprehended within the meaning and range of equivalents of the appended claims.

What is claimed is:

1. A mat-shaped solar heater comprising:
   (a) means forming two outer and a plurality of inner parallel flow channels for a heat-carrying medium all of which flow channels are in communication with each other, any two adjacent ones of said flow channels having a common linear divider, at least every other one of said dividers terminating short of an edge of said mat-shaped solar heater so as to form a plurality of pairs of two adjacent inner flow channels which communicate with each other near said edge;
   (b) inlet and outlet conduits communicating with the interior of said inlet and being in general alignment and therefore in direct communication with said two outer flow channels, respectively, for allowing heat-carrying medium to be introduced into and to flow out of all of said flow channels during normal operation of the solar heater, and;
   (c) means forming a plurality of closable discharge conduits which communicate with the interior of said solar heater in the region of said edge thereof, each of said closable discharge conduits being in general alignment and therefore in direct communication with two flow channels which constitute a respective pair of adjacent inner flow channels so that when said discharge conduits are closed during normal operation of the solar heater, said inlet and outlet conduits form the sole communication between the interior and exterior of said solar heater, whereas for purposes of draining the medium from the solar heater, said discharge conduits can be opened to allow the medium to flow out not only through said inlet and outlet conduits but also through said discharge conduits, thereby facilitating the removal of the medium from the interior of said solar heater and particularly from said inner flow channels.

2. A solar heater as defined in claim 1, wherein said discharge conduits are in alignment with respective ones of said dividers which terminate short of said edge.

3. A solar heater as defined in claim 1, wherein said inlet, outlet and discharge conduits are arranged along a straight line which is transverse to the direction of said parallel flow channels.

4. A solar heater as defined in claim 3, wherein said straight line is constituted by said edge.

5. A solar heater as defined in claim 1, wherein said dividers are arranged so that said parallel channels are serially connected and form a meander-shaped flow path extending from said inlet conduit to said outlet conduit.

6. A solar heater as defined in claim 1, wherein said dividers are arranged so that said parallel channels are connected in parallel so that as the medium flows from said inlet conduit to said outlet conduit, it will flow simultaneously through a plurality of parallel flow paths.

7. A solar heater as defined in claim 1, wherein said means forming said multiple parallel flow channels include two superposed layers of foil materials which are joined fluid-tightly to each other along straight lines, the fluid-tight joints constituting said dividers and said flow channels thus being bounded by said two layers and by consecutive dividers, said two layers being constituted by a single strip of foil material which is folded over so that two opposite portions of said single strip overlie each other, and thus form said two layers, respectively, and wherein the fold edge between said two opposite portions of said strip coincides with said edge of said solar heater.

8. A solar heater as defined in claim 7, wherein said inlet, outlet and discharge conduits are arranged along said edge of said solar heater.

* * * * *